Figure 1:
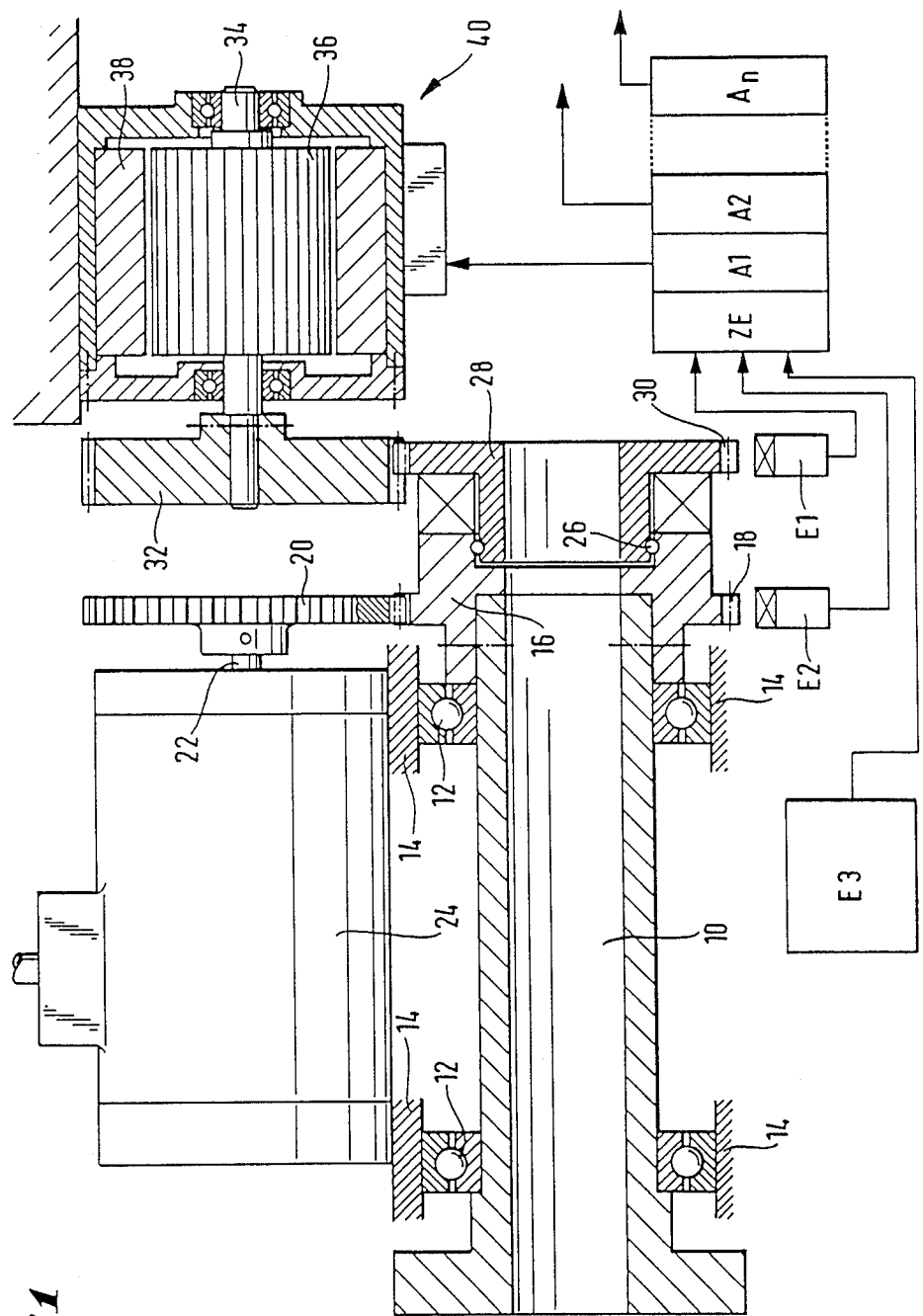

United States Patent [19]

Bald

[11] Patent Number: 4,573,379
[45] Date of Patent: Mar. 4, 1986

[54] APPARATUS FOR PRODUCING AN ADJUSTING TORQUE

[76] Inventor: Hübert Bald, Schutzenstrasse 1, D-5920 Bad Berleburg, Fed. Rep. of Germany

[21] Appl. No.: 493,697

[22] Filed: May 11, 1983

[30] Foreign Application Priority Data

May 13, 1982 [DE] Fed. Rep. of Germany ....... 3218083

[51] Int. Cl.⁴ ............................................. B23B 19/00
[52] U.S. Cl. ..................................... 82/28 R; 82/1.2; 82/2 E; 82/30; 279/1 R
[58] Field of Search .................. 279/1 M, 4, 1 R, 1 C, 279/111; 82/2 B, 2 E, 1.2–1.5, 28 R, 29 R, 30, 59, 67, 68, 40 R; 408/10, 133; 409/233; 310/80, 83, 191

[56] References Cited

U.S. PATENT DOCUMENTS

| | | | |
|---|---|---|---|
| 2,301,171 | 11/1942 | Morton et al. ...................... | 408/133 |
| 2,883,889 | 4/1959 | Diener .................................. | 408/133 |
| 3,771,802 | 11/1973 | Hiramatu et al. ....................... | 279/4 |
| 3,815,929 | 6/1974 | Steinberger et al. ................... | 279/4 |
| 3,898,911 | 8/1975 | De Caussin .......................... | 409/233 |
| 3,922,936 | 12/1975 | Link ................................... | 82/28 R |
| 4,080,716 | 3/1978 | von Dorp ............................... | 279/4 |
| 4,232,547 | 11/1980 | Kasper ............................... | 73/141 A |
| 4,254,676 | 3/1981 | Wilson ................................. | 279/1 R |
| 4,386,544 | 6/1983 | Fuminier ............................. | 82/40 R |
| 4,411,178 | 10/1983 | Wachs et al. .......................... | 82/2 E |
| 4,414,871 | 11/1983 | Trout .................................. | 82/40 R |

FOREIGN PATENT DOCUMENTS

| | | | |
|---|---|---|---|
| 2601493 | 6/1975 | Fed. Rep. of Germany ...... | 308/204 |
| 2659066 | 7/1978 | Fed. Rep. of Germany ........ | 408/10 |
| 2725747 | 7/1978 | Fed. Rep. of Germany .......... | 82/67 |
| 2734126 | 2/1979 | Fed. Rep. of Germany .......... | 82/1.2 |
| 2846337 | 5/1979 | Fed. Rep. of Germany ........ | 82/2 B |
| 486871 | 3/1976 | U.S.S.R. ............................... | 409/233 |

*Primary Examiner*—Leonidas Vlachos
*Attorney, Agent, or Firm*—McCormick, Paulding & Huber

[57] ABSTRACT

The apparatus comprises a motor stator which is stationary relative to the rotating spindle, while the rotor of the motor rotates in synchronism with, for example, the nut of a screw mechanism which as a whole forms part of the spindle. A variable dependent on the angular position of the nut is controlled by corresponding operation of the motor and can be maintained irrespective of the speed of rotation of the spindle. The apparatus is particularly intended and suitable for the work spindles of machine tools.

10 Claims, 5 Drawing Figures

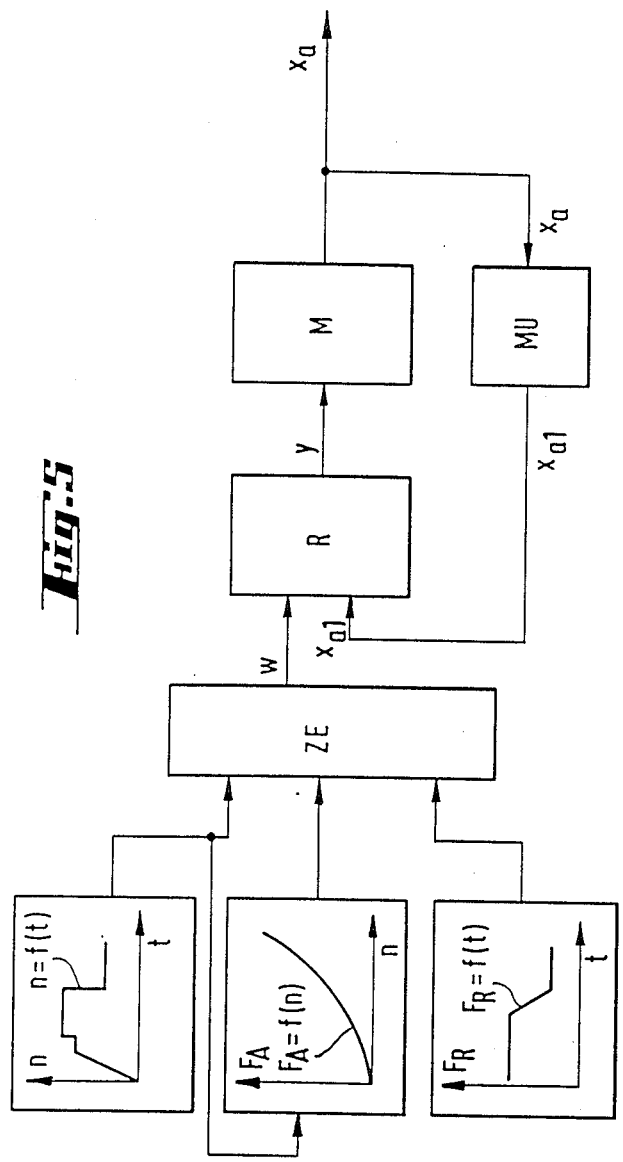

APPARATUS FOR PRODUCING AN ADJUSTING TORQUE

The invention relates to an apparatus for producing an adjusting torque on an input member of a movement conversion system, wherein the input member is rotatable relative to a supporting member of the system. A movement conversion system of this kind consists for example of a screw mechanism by means of which the rotation of the screw (or of the nut) is converted into an axial movement.

It is customary to produce the adjusting torque by means of an electric motor, for example with the aid of a controllable direct current motor.

A movement conversion system of this kind is often incorporated in a work spindle which is itself adapted to be driven rotationally, for example the work spindle of a lathe, for the purpose of operating a chuck through the movement conversion system, or is incorporated in the work spindle of a drilling or milling machine for the purpose of clamping a tool.

In such cases also it is customary to produce the adjusting torque with the aid of an electric motor; so-called electric clamping devices, described in the leaflet 500.01.7 D/1979 of Messrs. Paul Forkardt, Düsseldorf, are commercially available for this purpose.

This known electric clamping device can be constructed and disposed in such a manner that it is coupled to the input member of the movement conversion system only when the spindle is stationary, but is uncoupled when the spindle rotates. This case is without particular interest in the present context. The electric clamping device may however also be incorporated in the work spindle and rotate together with the latter, but this known arrangement also allows production of the adjusting torque only while the spindle is stationary.

It would however be conceivable and possible for the electric clamping means also to be operated during the rotation of the spindle. Since the motor is a component part of the spindle and the supporting member of the movement conversion system is likewise connected to the spindle, the latter is a stationary component—viewed from the system comprising the motor and the movement conversion system—whatever angular position it actually assumes in space. In other words, the rotation of the spindle would not affect the mode of operation of a fictitious device of this kind.

A device of this kind, if it existed, could in many cases simplify and improve machining operations. This will be illustrated with the aid of only two examples.

In the turning of workpieces considerable clamping forces are required during rough machining, whereas during smoothing it would be desirable to reduce the clamping forces accordingly in order to achieve minimum deformation of the workpiece in the clamped region. Similar considerations apply in connection with reducing wall thickness of the workpiece as the work proceeds in the hollowing of a workpiece by turning, or in connection with centrifugal force compensation of the clamp jaws. For this reason it would be desirable to be able to vary the clamping force—and consequently the adjusting torque in the movement conversion system used to produce this force—in a controlled manner during the rotation of the spindle.

In the case of drilling or milling work use is sometimes made of tools having radially adjustable cutting edges. For certain shapes, for example undercut bores, it would be desirable to be able to control this radial adjustment in dependence on the down feed, during the rotation of the work spindle; for this purpose it would also be possible to use an adjusting torque producer able to be operated during the rotation of the spindle.

The known electric clamping device does in theory make this possible, as has been explained above; in practice, however, serious problems arise.

The electric motor rotating with the work spindle very considerably increases the moment of inertia of the spindle. These moments of inertia must be accelerated or retarded whenever there is a change of the speed of rotation, and the higher the final speed, the more difficult this problem becomes. Nevertheless, in order to make economical use of modern high efficiency materials, machines are built for increasingly high speeds. This entails an additional problem for the motor: at high speeds the centrifugal forces acting on it are so considerable that the stator of the motor, in particular, is overloaded in respect of its mechanical strength.

The problem underlying the invention is that of providing an apparatus of the kind stated to be known, which however can also be used at very high spindle speeds.

Since it must be possible to produce the adjusting torque at any time irrespective of the speed of rotation of the work spindle, the rotor of the adjusting motor always rotates in synchronism with the input member; it may also be incorporated directly in the spindle or it may be coupled to the input member by a transmission means. The situation is different for the stator: the latter is stationary and therefore need not be designed with due regard to the abovedescribed problems in connection with moments of inertia and centrifugal forces.

The reaction adjusting torque can then no longer be supported on the spindle, but is supported likewise on stationary components in order to close the force flow; the "reaction adjusting torque" is opposite and equal to the adjusting torque less the torques required to cover frictional losses. Thus the apparatus is nevertheless not yet ready for use. In order to produce a predetermined adjusting torque, electric power must in fact be supplied to the adjusting motor—for example to the stator of the motor. The magnitude of this power must therefore be controlled. Since however the rotor of the motor is already rotating relative to the stator (or can rotate relative to the stator), quite different electric powers must be supplied in order to produce a determined adjusting torque, depending on the point in the family of characteristics of the motor at which the action is applied at the moment in question. Even if no adjustment of the movement conversion system at all is to be made, it will as a rule be necessary to supply to the adjusting motor the power which is necessary to compensate for mechanical and electrical losses, since otherwise the movement conversion system would be adjusted without being under control.

For the complete solution of the problem provision is therefore made according to the invention for feedback relating to the state of the movement conversion system to be transmitted, at least during the adjustment operation, to the motor control unit, which accordingly regulates the power supplied to the adjusting motor, while in the control loop thus formed the actual speed of rotation of the work spindle is received and taken into account as a disturbance variable.

It should be observed that it is not absolutely necessary for the speed of rotation of the spindle itself to be measured and fed back. If for example the movement conversion system operates the chuck of a lathe, the clamping force can be regulated and controlled by accordingly varying the power of the adjusting motor. The spindle speed is received as a disturbance variable inasmuch as the working point is accordingly displaced in the family of characteristics of the motor; in the case of direct current motors, for example, it is detected by the corresponding variation of the counter-electromotive force.

In other cases, however, the problem may arise of turning the input member of the movement conversion system by accurately defined angular steps relative to to the supporting member—and therefore relative to the work spindle itself—in accordance with a predetermined program. In such cases the angular rotation of the work spindle itself must be imposed on the control circuit, and the situation is similar in the case of the requirement of a programmed adjusting speed, in which case the speed of rotation of the spindle is measured and processed as a disturbance variable.

It can readily be understood that the apparatus according to the invention is the more advantageous both in respect of the adjusting motor power required to be installed (dimensions of the corotating rotor) and in respect of accuracy of control, the lower the friction in the movement conversion system. Instead of the usual screw mechanism hitherto most often employed, in which by far the major part of the power supplied is used to overcome mechanical friction, it is therefore preferred to use a rolling screw mechanism, the efficiency of which is higher by several orders of magnitude. It is however obvious that the invention is not restricted to a movement conversion system of this kind; it may be applied to any other mechanical or even hydraulic systems.

Figure 2:
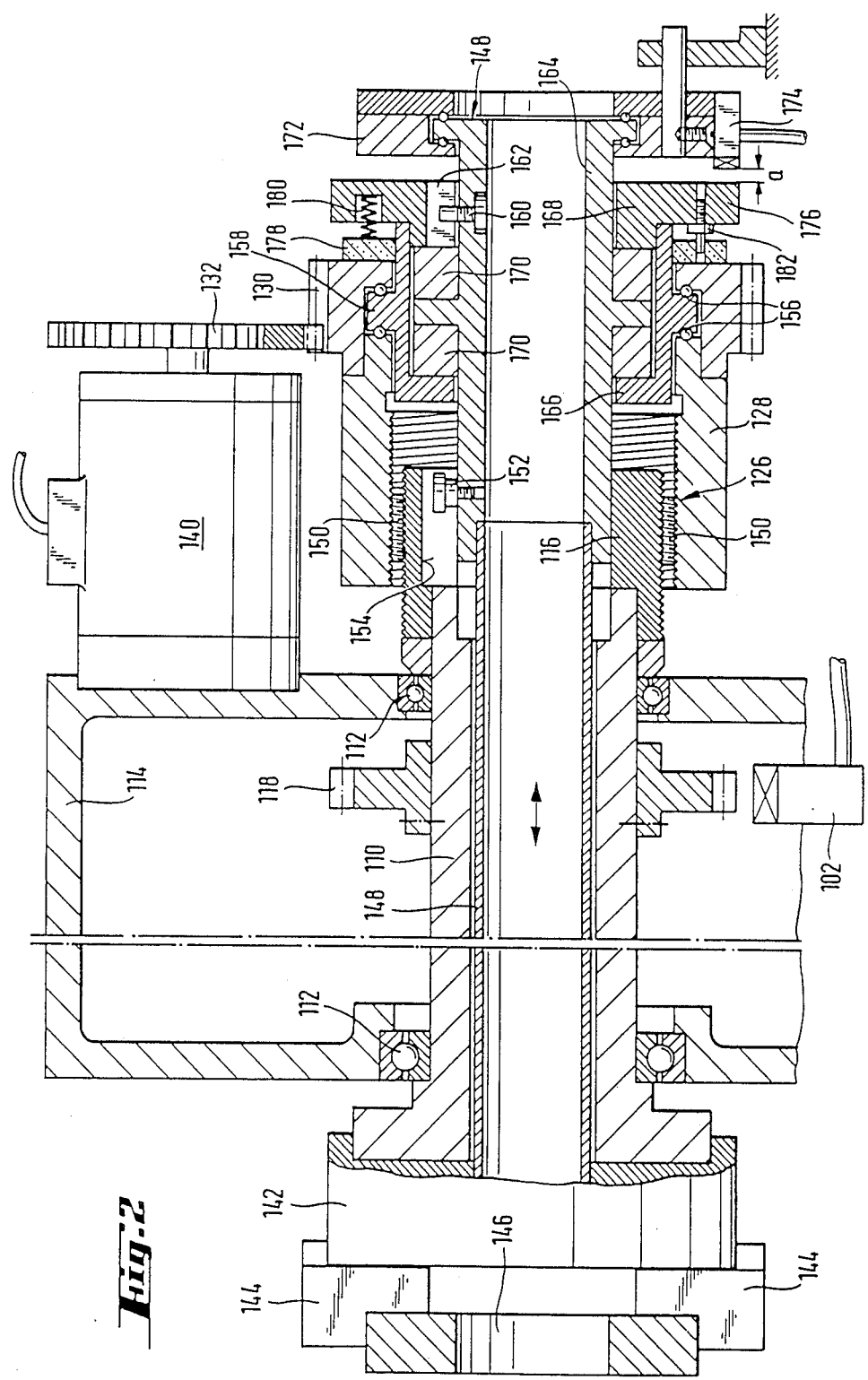
Figure 3:
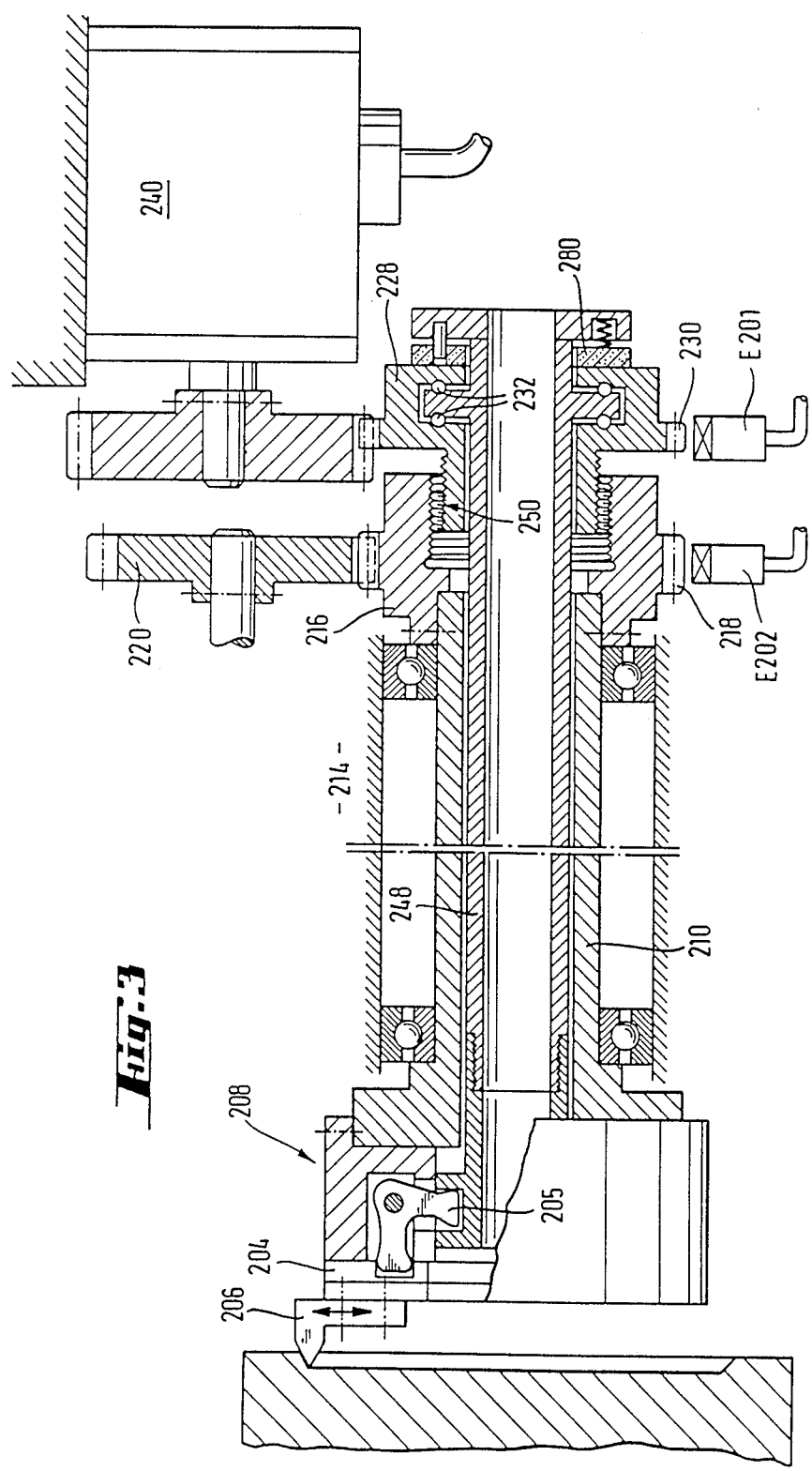
Figure 4:
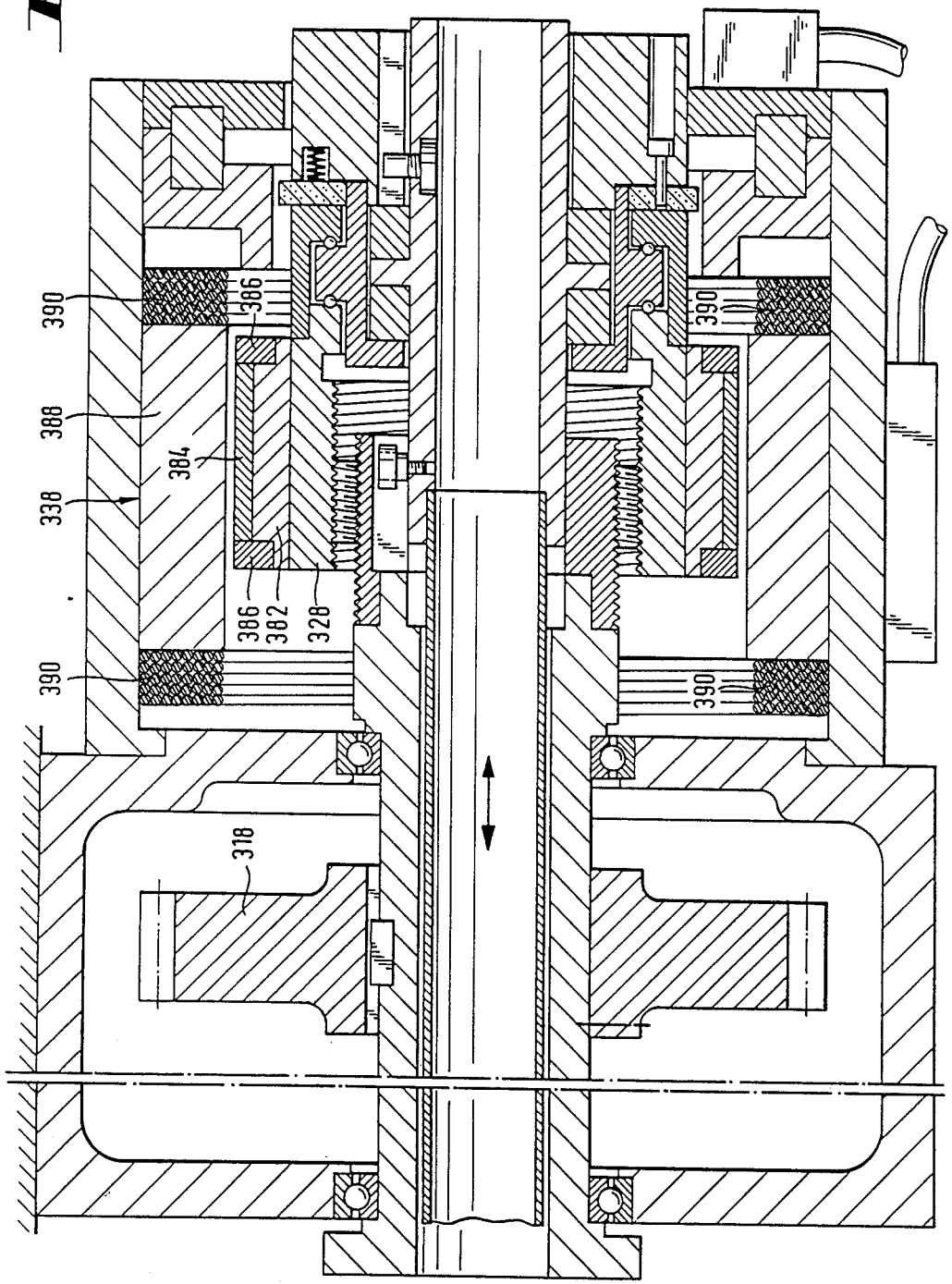

Examples of embodiment of the subject of the invention are explained more fully below with reference to the accompanying drawings, in which:

FIG. 1 shows schematically the construction of the apparatus according to the invention, FIG. 2 is a substantially schematic axial section of the apparatus combined with the spindle of a lathe, FIG. 3 is a substantially schematic axial section of the apparatus combined with the work spindle of an internal turning lathe, FIG. 4 shows similarly to FIG. 2 an embodiment constituting an alternative to that shown in FIG. 2, and FIG. 5 is a block circuit diagram explaining the mode of operation permitted by the apparatus.

FIG. 1 shows a work spindle 10, which here is hollow and which is mounted by means of ball bearings 12 in a machine bed 14. To serve as supporting member of a movement conversion system the spindle carries a flange 16 having a toothed rim 18 which meshes with the gear 20 on the output shaft 22 of a geared spindle drive motor 24. In the flange 16 is mounted in ball bearings 26, for rotation relative to the said flange, a sleeve 28 which forms the input member of the movement conversion system. The components which corotate with the spindle, and which are operated by a relative rotation of this kind, are not shown in FIG. 1.

The sleeve 28 also has a toothed rim 30 which meshes with the output gear 32 on the shaft 34 of the rotor 36, which in turn is mounted for rotation in the stationary stator 38 of the adjusting motor 40.

A control unit E3 supplies the guide signals for the angle of rotation of the sleeve 28 relative to the flange 16, and the central unit ZE produces corresponding power signals for the adjusting motor 40. Since the flange 16 however itself turns with the spindle 10, the relative phase angle, which is to be controlled, between the flange 16 and the sleeve 28 is constantly detected and transmitted as the actual value to the control system. This relative phase angle can be determined with the aid of measuring means which rotate together with the spindle, and then be transmitted, for example by radio, to the central unit; in FIG. 1, however, a different solution is shown for the sake of clarity:

On the side of the toothed rims 18 and 30 which is remote from the motors 24 and 40 respectively, sensors E1 and E2 respectively, for example inductive transducers, are disposed, which incrementally detect the various angular positions of the two toothed rims relative to the machine bed 14, the difference being formed in the central unit ZE.

The central unit may be the central computer of a numerical control system for a machine and, in addition to the power control signals for the adjusting motor 40 it then produces additional signals for other adjusting motors (not shown) through respective output stages, A1, A2, ... An.

It should be observed that even in the event of the absence of adjusting signals from the control unit E3 the central unit ZE must supply power signals to the adjusting motor 40 during the rotation of the spindle. In this connection it is sufficient to consider the case in which the spindle drive motor 24 is switched on from the stationary state. The spindle 10 then runs up to speed but, depending on friction conditions, the sleeve 28 would then be stationary or would make uncontrolled rotations. The adjusting motor 40 must therefore always at least cause the sleeve 28 to follow the spindle; the adjusting motor is thus at the same time also a drive motor. Since in such machines the spindle drive is itself speed-controlled, the power input of the motor 24 varies in the sense of compensation for the variation of speed of rotation which would otherwise occur. The specialist will therefore understand that the control circuits must be carefully adjusted to one another in order to prevent hunting. This is a consequence of the fact that the force flow for the adjustment of the sleeve 28 is in the end closed through the stators of the two motors 24 and 40 and the machine bed 14.

FIG. 2 shows an embodiment in which the controlled variable is the clamping force applied to a lathe chuck.

The spindle 110 mounted at 112 in the machine bed 114 carries the chuck body 142, whose chuck jaws 144 hold a workpiece 146. The radial movement of the jaws 144 is achieved with the aid of a conventional wedge mechanism or angle lever (not shown) through the axial displacement of a push-pull tube 148 relative to the spindle 110, and this displacement is derived, with the aid of the movement conversion system, from the rotary movement of the sleeve 128 relative to the flange 116, which is rotationally fixed to the spindle 110. The rolling screw drive 126 here corresponds to the mounting 26 in FIG. 1; the flange 116 carries the appertaining external screwthread and the sleeve 128 carries the appertaining internal screwthread, while the transmission members 150 in the form of threaded rollers serve at the same time as rotational bearings and as axial guides for the sleeve 128, which thus itself makes the axial movement. As in FIG. 1, the toothed rim 130 of the sleeve is constantly in mesh with the output gear 132 of the adjusting motor 140; in order to ensure that this meshing is maintained despite the axial movement of the sleeve relative to the spindle 110, and thus relative to the machine bed and to the motor 140, the toothed rim 130 has a width increased by the maximum axial movement of the sleeve.

The push-pull tube should be rotationally fixed relative to the spindle 110. It therefore carries a driver 152 which is guided in a longitudinal groove 154 in the flange 116. The axial movements—but not the relative rotational movements—of the sleeve 128 are transmitted via ball bearings 156 to an intermediate ring 158, which in turn is rotationally fixed to the push-pull tube 148 by means of a driver 160 and a longitudinal guide groove 162. Elastomer springs 170, which are compressible in the axial direction and serve as tensional force storage means, are embedded between a radial collar 164 on the tube 148 and reentrant internal shoulders 166, 168, on both sides of the said collar, on the intermediate ring 158. The relationship between the axial compression stroke and the stored force, that is to say the spring characteristic of the elastomer springs 170, is known or can easily be determined by experimentation. This compression stroke accordingly forms a measure of the clamping force which it is desired to control. In order to transmit a corresponding signal to the control system (not shown), a measuring ring 172 is mounted on the push-pull tube 148 for axial displacement together with the latter, this ring being held rotationally fixed relative to the machine bed and carrying a distance sensor 174 of known type, for example a capacitive sensor, which transmits a signal representing the axial distance from the intermediate ring 158. On the corresponding flange 176 on the intermediate ring 158 is supported by means of springs 180 a brake ring 178 which is guided axially by means of pins 182.

This brake ring intentionally makes the movement conversion system "hard running", so that for every variation of the clamping force a power greater than the total static friction losses must be supplied to the adjusting motor, whereas a power level lower than that value is sufficient to maintain a clamping force which has once been adjusted. This simplifies the design of the control device and reduces the risk of hunting.

On the spindle 110 is also keyed a rim gear 118, with which is associated an incremental action rotary speed transducer 102 enabling the actual speed at any moment to be fed as a disturbance variable to the control device; the spindle drive motor (not shown) can also act on this rim gear.

FIG. 3 illustrates an application in which the work spindle 210 carries an adjustable internal turning head 208. The internal turning tool 206 is mounted in a radially guided tool holder 204, which is coupled by means of an angle lever 205 to a push-pull tube 248 which is axially displaceable relative to the spindle 210. On the side remote from the headstock 214, the spindle 210 carries a supporting member 216 having an external rim gear 218 which meshes with the output gear 220 of the spindle drive motor (not shown). The input member of the movement conversion system is formed by a thrust collar 228 whose rim gear 230 meshes with the output of the adjusting motor 240. The supporting member 216 is provided with the internal screwthread of a rolling screw mechanism 250 provided with transmission rollers, while the external screwthread is formed on the thrust collar 228. A rotation of the latter relative to the spindle, and therefore relative to the supporting member 216, accordingly leads to an axial displacement of the thrust collar, and this displacement is transmitted through end roller bearings 232 directly, that is to say without interposed force storage means as in the case of FIG. 2, to the push-pull tube 248. The function of the brake ring 280 corresponds to that shown in FIG. 2.

The various angles of rotation or speeds of the spindle and the thrust ring are detected incrementally by means of transducers E 202 and E 201, as in FIG. 1, and fed to the control device (not shown).

The embodiment shown in FIG. 4 corresponds substantially to that shown in FIG. 2, so that only the differences need now be explained. In FIG. 4 the adjusting motor provided is an asynchronous motor of the squirrel-cage rotor type, and the rotor directly forms an integral component of the input member of the movement conversion system. This input member is the sleeve 328 (as in FIG. 2), on which here however an insulating ring 382 is mounted, the cage bars 384 and short-circuit rings 386 of the adjusting motor rotor being embedded in the ring 382. The stator 338, consisting of the pole pieces 388 and windings 390, is stationary and disposed coaxially to the rotor. The spindle drive acts on the rim gear 318.

FIG. 5 shows in the form of a block circuit diagram the control of the clamping force in the embodiment illustrated in FIG. 2; it should be observed that this diagram can also be appropriately applied to the control of the angular position or relative speed of rotation of the input member.

The adjusting motor 140 supplies the adjusting torque $x_a$, which by means of the measuring transducer MU (including the distance sensor 174 in FIG. 2) is converted into an electric signal $x_{a1}$, which by means of the control device R is compared with a command variable w in the form of a corresponding signal, so that the correction signal y can be derived therefrom.

The command value w is variable in order to enable the clamping force to be adapted in optimum manner to the machining task. It is formed (calculated) in the central unit ZE, the speed of rotation n of the work spindle, the centrifugal force $F_a$ requiring compensation at the moment in question, and a desired clamping force $F_R$ being fed to the central unit as influencing variables.

The rotational speed n of the work spindle follows a program in accordance with the progress of the work in the machining of a determined workpiece, this program being here shown as time-dependent, with n equal to f(t); dependence on determined feed movements would also be possible. The same applies to the desired clamping force $F_R = f(t)$. On the other hand, the centrifugal force is in turn dependent on the speed of the spindle, and this dependence can be stored, for example digitally in table form, and the appertaining centrifugal force can be recalled for every speed. Since, however, this function is completely different in dependence on the diameter of the workpiece, it is expedient to measure the function data (by determining the variation of clamping force for an unchanged position of the sleeve 128 within the speed range n to be expected) before series machining is started, the respective data being stored.

The specialist will realise that control devices of the kind in question can be so designed that they form an integral component of the numerical control systems which are in any case provided in modern machine tools. Because of the use of low-friction and in particular constant friction rolling screw mechanisms as movement conversion systems, only relatively low adjusting powers are required, so that it is possible to use the same types of adjusting motors as are already customarily used in numerically controlled machines, and as a result the signal processing circuits already provided can also be used.

I claim:

1. The combination comprising a machine having a rotatable spindle for carrying a tool or workpiece, and apparatus having a roller worm gear mechanism coaxially supported on the spindle and including a threaded input member supported for coaxial rotation with and relative to said spindle and a threaded output member supported for axial displacement along the spindle and relative to said input member and a plurality of threaded rollers disposed between and threadably engaged with said input member and said output member for axially displacing said output member along said spindle in response to rotation of said input member relative to said output member, drive means for rotating said input member relative to said output member and said spindle and including an adjusting motor having a stator mounted in fixed position on the machine and a rotor for driving said input member, clamping force storage means supported to rotate with said spindle for receiving force transmitted thereto by axial displacement of said output member relative to said input member and including an element axially displacable in response to the force received by said force storage means, means for transmitting to the tool or workpiece said force stored by said force storage means, first pick-up means for detecting the axial displacement of said element and generating an output signal relative thereto, second pick-up means for detecting the speed of rotation of said spindle relative to said rotor and generating an output signal related thereto, and a motor control circuit responsive to output signals from said pick-up means for controlling the speed of said adjusting motor.

2. The combination of claim 1 wherein said control circuit includes means responsive to the rotational speed of the work spindle to isolate a disturbance variable from variations in the spindle speed to compensate for centrifugal force.

3. The combination of claim 1 wherein said control circuit includes means responsive to machining forces acting on the spindle to isolate a disturbance variable from variations in machining forces.

4. The combination of claim 1 wherein said first pick-up means comprises means for sensing difference in augular position between said input member and said spindle.

5. The combination of claim 1 wherein a tool is rotating with the work spindle, and wherein said control circuit includes means for sensing changes in the axial feed of the work spindle.

6. The combination of claim 1 wherein said input member is integral with said rotor of the adjusting motor, and said stator of the adjusting motor said rotor of the latter and the input member are all disposed concentrically relative to the axis of the work spindle.

7. The combination of claim 1 wherein said adjusting motor has a drive shaft disposed axially parallel relative to the work spindle, and a coupling means between said rotor and said input member and disposed concentrically relative to the axis of the work spindle.

8. The combination of claim 1 wherein the adjusting motor is a servomotor operated by a numerical control system.

9. The combination of claim 1 wherein an adjustable brake device is associated with said worm gear mechanism.

10. The combination of claim 1 wherein the clamping force storage means comprises a spring having a predetermined spring characteristic, and wherein the magnitude of the spring deformation can be detected as a measurable variable.

* * * * *